Patented Nov. 15, 1938

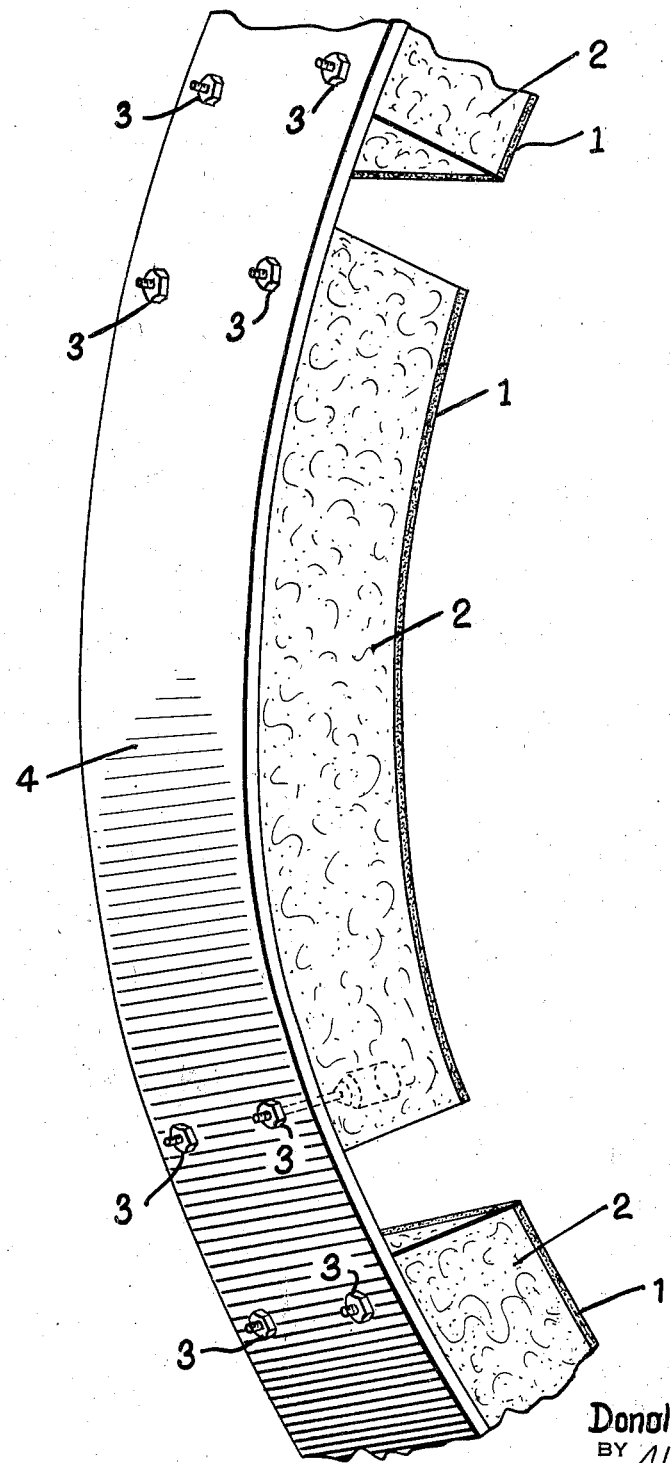

2,136,585

UNITED STATES PATENT OFFICE 2,136,585

COMPOSITE BRAKE BLOCK

Donald S. Bruce, Somerville, N. J., assignor to Johns-Manville Corporation, New York, N. Y., a corporation of New York Application August 14, 1937, Serial No. 159,062

1 Claim. (Cl. 188—251)

The present invention relates to improvements in friction materials such as brake blocks.

In certain types of equipment wherein friction elements are employed, they are subject to exceptionally extreme operating conditions which make it desirable to employ friction materials exhibiting especially high wear- and heat-resistance. This type of equipment is exemplified by the band type, heavy duty brake of the general form commonly used in conjunction with cable winding drums in oil well drilling equipment. Friction materials suitable for this type of service from the standpoint of wear- and heat-resistance are exemplified by brake block elements such as described in United States Pat. No. 1,264,924 to Headson, comprising a mixture of a binder such as a rubber compound and short pieces of asbestos yarn molded under heat and pressure into compact rigid blocks of the required size for use as braking elements. It has been found that materials of this type frequently do not give satisfactory braking action during the initial period of use, but do exhibit especially satisfactory braking characteristics after being in use for a fairly long period of time, for instance, several days to a week. The unsatisfactory performance obtaining during this initial period, referred to as the "wearing-in" period, is of course highly objectionable, and the primary object of my invention is the provision of a friction element adapted for use under the severe service conditions referred to, but not subject to this defect and capable of exhibiting satisfactory braking performance throughout the working life of the braking element.

I have found these results may be accomplished by forming the wearing face portion of the friction element of two integrally united laminations, the outer lamination being composed of a composition friction material of relatively low wear-resistance and relatively thin compared to the friction material constituting the inner lamination.

Referring to the appended drawing which illustrates one type of composite brake block embodying my invention and its application to a supporting steel band, such as is employed on band types of brakes for oil well drilling equipment, the block is provided with a wearing face portion consisting of two integrally united laminations, a relatively thin outer lamination I consisting of relatively low wear-resistant composition friction material wherein the fibrous content extends in a direction generally parallel to the face surface, and a relatively thick inner lamination 2 of relatively great wear-resistant composition friction material wherein the fibrous content is distributed throughout in a heterogeneous arrangement. Suitable countersunk apertures are provided in the block through which fastening means such as bolts 3 are inserted to securely hold the block to the support employed, such as the brake band 3. In ordinary practice, brake blocks are kept in use until worn down to about the level of the heads of the supporting bolts or other fastening devices employed, hence, the "wearing face portion" with reference to my block is descriptive of the portion of the block extending above this level and, hence, to that portion which is normally worn away during use of the block.

It will be evident that a wide variation in the composition of the friction material forming the inner and outer laminations may be employed in friction elements produced in accordance with my invention. One of such elements which exhibits especially desirable braking characteristics and which has been employed with noteworthy success in band types of brakes on oil well drilling equipment comprises a wearing face having an outer lamination of composition friction material of the so-called "sheeter" or "layer accreted" type integrally united to an inner lamination composed of friction material of a composition and manufactured by a molding procedure such as described in the above-cited Headson patent.

Brake lining of the sheeter type is conventionally made from stock including a mixture of a rubber compound, asbestos fibres and a volatile solvent in sufficient amount to render the solids plastic and workable. This stock is formed into a continuous sheet suitable for use as a brake lining material by a "layer-accretion" or "sheeting" operation such as that described in United States Patent No. 1,771,749 to Eisenhardt and No. 1,890,424 to Whitworth. The sheeter material thus formed consists of successively accreted and united layers or films of the asbestos fibre-rubber mixture in which the fibres are oriented so that they extend in a direction predominantly parallel to the surface of the sheet. The wear-resistance of sheeter brake lining made from stock of conventional composition and the conventional method such as that described in the above-cited Eisenhardt and Whitworth patents is relatively low compared to the wear-resistance of a molded element made pursuant to the Headson patent. The latter type of friction element is characterized by a heterogeneous arrangement of the fibre content since the fibres extend in all directions therein.

In the production of a brake block element pursuant to my invention, the stock employed for the inner lamination may be of a composition similar to that described in the Headson patent including a moldable mixture of a rubber compound and short pieces of asbestos yarn. A thin strip of sheeter type of brake lining material of a length and width corresponding to that of the wearing face of the finished element is first placed in the bottom of the mold which has a curvature corresponding to that of the wearing face of the finished element. The top surface of the strip is preferably coated with a rubber cement to enhance the strength of the bond between the strip and the inner lamination. The required amount of the moldable mixture referred to is then added and the two layers integrally united by the application of heat and pressure into a solid mass, the temperature and pressure employed at this stage suitably corresponding to that employed in molding the Headson type composition. A typical ratio of wear-resistance of the sheeter material forming the outer lamination, and the Headson type of mold element forming the inner lamination expressed in terms of rate of wear in cubic inches per horsepower hour was determined as .012/.0016.

The optimum thickness of the outer lamination is subject to variation dependent upon the type of braking equipment employed and service to which the element is subjected, and the particular characteristics of the composite friction material employed in the respective laminations. In general, the outer lamination is very much thinner than the inner lamination and is designed to serve as the wear-resistant element only during the preliminary "setting" or "wearing-in" period for the element, for example, in a brake block such as has been employed on a band type brake for oil well drilling equipment, having an outer lamination of sheeter material and an inner lamination of the moldable mixture above referred to with overall dimensions of 9¾" x 13" x 1⅛" thick and a radius curvature of 28⅛"; an outer lamination of ⅟₁₆" thickness and an inner lamination of 1⅟₁₆" thickness has been employed with entirely satisfactory results. A brake block element thus made has been found to exhibit entirely satisfactory braking characteristics after a few applications as compared with a wearing-in period of several days to a week which has been found to be frequently necessary when the Headson type of material alone constituted the wearing face.

In place of using the Headson type of friction element for the inner lamination, other types of composition friction materials having high wear and heat-resistance of the same general order may be substituted, these in general being characterized by a high degree of compactness and rigidity and hence require an unduly long wearing-in period for certain types of service conditions.

Likewise in place of using a sheeter type of friction material for the outer lamination, other friction materials having a relatively low wear-resistance compared to that of the inner lamination may be substituted therefor. In general, such materials preferably comprise a mixture of a heat-resistant fibre, such as asbestos, and a binder, such as rubber, and exhibit frictional characteristics such as resistance to heat and a coefficient of friction of an order comparable with that of the inner lamination, but are so composed and manufactured as to exhibit a substantially less resistance to wear.

What I claim is:

A brake block having a wearing face portion comprising two integrally united laminations of friction material, the inner lamination being composed of a molded rigid friction composition including a binder such as rubber and short pieces of asbestos yarn, said composition being of high wear-resistance relative to the wear-resistance of the friction material of the outer lamination and of a thickness sufficient to constitute it the major wear-resistant element during the working life of the block, the outer lamination being composed of layer accreted friction material also including a binder such as rubber and asbestos fibre but in such proportions and so distributed that said material is of substantially less wear-resistance and thickness than the material of the inner lamination and adapted to constitute the wear-resistant element only during a relatively short initial period of the total working life of the block.

DONALD S. BRUCE.